US008285782B2

(12) United States Patent
Muir et al.

(10) Patent No.: US 8,285,782 B2
(45) Date of Patent: *Oct. 9, 2012

(54) METHODS AND APPARATUS FOR MAKING A HYPERMEDIUM INTERACTIVE

(75) Inventors: Jeff Muir, Delray Beach, FL (US); Andrew Stergiades, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/242,921

(22) Filed: Sep. 23, 2011

(65) Prior Publication Data

US 2012/0072486 A1    Mar. 22, 2012

Related U.S. Application Data

(63) Continuation of application No. 12/054,987, filed on Mar. 25, 2008, now Pat. No. 8,090,793, which is a continuation of application No. 10/689,824, filed on Oct. 20, 2003, now Pat. No. 7,359,953, which is a continuation of application No. 10/068,790, filed on Feb. 6, 2002, now Pat. No. 6,691,157, which is a continuation of application No. 09/247,220, filed on Feb. 10, 1999, now Pat. No. 6,370,570, which is a continuation of application No. 08/556,623, filed on Nov. 13, 1995, now Pat. No. 6,088,515.

(51) Int. Cl.
*G06F 15/16* (2006.01)
(52) U.S. Cl. .................... 709/203; 709/217; 715/205
(58) Field of Classification Search .................... None
See application file for complete search history.

(56) References Cited

U.S. PATENT DOCUMENTS

| 4,387,425 A | 6/1983 | El-Gohary |
| 4,499,499 A | 2/1985 | Brickman et al. |
| RE32,632 E | 3/1988 | Atkinson |
| 4,779,189 A | 10/1988 | Legvold et al. |

(Continued)

FOREIGN PATENT DOCUMENTS

EP    0 381 645 A2    8/1990
(Continued)

OTHER PUBLICATIONS

Written Opinion for PCT/US96/17937 dated Sep. 1, 1997.
(Continued)

*Primary Examiner* — Jeffrey R Swearingen
(74) *Attorney, Agent, or Firm* — Foley & Lardner LLP; John D. Lanza

(57) ABSTRACT

The present disclosure is directed to a system and method of making a hypermedium page interactive. Responsive to a user selecting a hyperlink on a hypermedium page displayed on a client node, a client agent located on the client node establishes a communications link from the client agent to an application execution server agent on an application server using information located in a hyperlink configuration file, corresponding to the hyperlink displayed on the client node, obtained from the network server node. Responsive to the creation of the communications link between the application execution server agent and the client agent, the application executes on the application execution server and the user is capable of interactively using the application running on the application execution node from the client node. Data input and display occurs at the client node under the control of the client agent.

14 Claims, 2 Drawing Sheets

U.S. PATENT DOCUMENTS

| | | | |
|---|---|---|---|
| 4,860,247 A | 8/1989 | Uchida et al. | |
| 4,887,204 A | 12/1989 | Johnson et al. | |
| 4,903,218 A | 2/1990 | Longo et al. | |
| 4,937,036 A | 6/1990 | Beard et al. | |
| 4,937,784 A | 6/1990 | Masai et al. | |
| 4,949,281 A | 8/1990 | Hillenbrand et al. | |
| 4,958,303 A | 9/1990 | Assarpour et al. | |
| 4,974,173 A | 11/1990 | Stefik et al. | |
| 5,014,221 A | 5/1991 | Mogul | |
| 5,031,089 A | 7/1991 | Liu et al. | |
| 5,062,060 A | 10/1991 | Kolnick | |
| 5,072,412 A | 12/1991 | Henderson et al. | |
| 5,103,303 A | 4/1992 | Shoji et al. | |
| 5,119,319 A | 6/1992 | Tanenbaum | |
| 5,155,847 A | 10/1992 | Kirouac et al. | |
| 5,175,852 A | 12/1992 | Johnson et al. | |
| 5,187,790 A | 2/1993 | East et al. | |
| 5,202,971 A | 4/1993 | Henson et al. | |
| 5,204,897 A | 4/1993 | Wyman | |
| 5,204,947 A | 4/1993 | Bernstein et al. | |
| 5,231,697 A | 7/1993 | Yamada | |
| 5,233,701 A | 8/1993 | Nakata et al. | |
| 5,241,625 A | 8/1993 | Epard et al. | |
| 5,247,683 A | 9/1993 | Holmes et al. | |
| 5,249,290 A | 9/1993 | Heizer | |
| 5,255,361 A | 10/1993 | Callaway et al. | |
| 5,297,249 A | 3/1994 | Bernstein et al. | |
| 5,301,270 A | 4/1994 | Steinberg et al. | |
| 5,305,440 A | 4/1994 | Morgan et al. | |
| 5,307,490 A | 4/1994 | Davidson et al. | |
| 5,309,555 A | 5/1994 | Akins et al. | |
| 5,315,711 A | 5/1994 | Barone et al. | |
| 5,325,527 A | 6/1994 | Cwikowski et al. | |
| 5,329,619 A | 7/1994 | Page et al. | |
| 5,333,237 A | 7/1994 | Stefanopoulos et al. | |
| 5,341,477 A | 8/1994 | Pitkin et al. | |
| 5,341,478 A | 8/1994 | Travis, Jr. et al. | |
| 5,351,129 A | 9/1994 | Lai | |
| 5,367,688 A | 11/1994 | Croll | |
| 5,412,727 A | 5/1995 | Drexler et al. | |
| 5,414,457 A | 5/1995 | Kadowaki et al. | |
| 5,430,876 A * | 7/1995 | Schreiber et al. | 719/328 |
| 5,440,719 A | 8/1995 | Hanes et al. | |
| 5,457,797 A | 10/1995 | Butterworth et al. | |
| 5,461,608 A | 10/1995 | Yoshiyama | |
| 5,469,540 A | 11/1995 | Powers et al. | |
| 5,473,599 A | 12/1995 | Li et al. | |
| 5,483,466 A | 1/1996 | Kawahara et al. | |
| 5,485,460 A | 1/1996 | Schrier et al. | |
| 5,499,343 A | 3/1996 | Pettus | |
| 5,509,070 A | 4/1996 | Schull | |
| 5,515,508 A | 5/1996 | Pettus et al. | |
| 5,517,617 A | 5/1996 | Sathaye et al. | |
| 5,524,253 A | 6/1996 | Pham et al. | |
| 5,526,492 A | 6/1996 | Ishida et al. | |
| 5,530,852 A | 6/1996 | Meske, Jr. et al. | |
| 5,537,546 A | 7/1996 | Sauter et al. | |
| 5,537,548 A | 7/1996 | Fin et al. | |
| 5,541,927 A | 7/1996 | Kristol et al. | |
| 5,548,726 A | 8/1996 | Pettus | |
| 5,551,030 A | 8/1996 | Linden et al. | |
| 5,553,242 A | 9/1996 | Russell et al. | |
| 5,557,539 A * | 9/1996 | Fitch | 709/206 |
| 5,557,732 A | 9/1996 | Thompson | |
| 5,557,748 A | 9/1996 | Norris | |
| 5,557,765 A | 9/1996 | Lipner et al. | |
| 5,561,769 A | 10/1996 | Kumar et al. | |
| 5,566,302 A | 10/1996 | Khalidi et al. | |
| 5,572,643 A | 11/1996 | Judson | |
| 5,572,674 A | 11/1996 | Ernst | |
| 5,574,934 A | 11/1996 | Mirashrafi et al. | |
| 5,577,188 A | 11/1996 | Zhu | |
| 5,579,469 A | 11/1996 | Pike | |
| 5,583,563 A | 12/1996 | Wanderscheid et al. | |
| 5,583,992 A | 12/1996 | Kudo et al. | |
| 5,586,312 A | 12/1996 | Johnson et al. | |
| 5,592,626 A | 1/1997 | Papadimitriou et al. | |
| 5,594,490 A | 1/1997 | Dawson et al. | |
| 5,596,745 A | 1/1997 | Lai et al. | |
| 5,604,490 A | 2/1997 | Blakley et al. | |
| 5,606,493 A | 2/1997 | Duscher et al. | |
| 5,619,716 A | 4/1997 | Nonaka et al. | |
| 5,623,603 A | 4/1997 | Jiang et al. | |
| 5,623,656 A | 4/1997 | Lyons | |
| 5,640,454 A | 6/1997 | Lipner et al. | |
| 5,644,720 A | 7/1997 | Boll et al. | |
| 5,657,390 A | 8/1997 | Elgamal et al. | |
| 5,668,999 A | 9/1997 | Gosling | |
| 5,671,379 A | 9/1997 | Kuse et al. | |
| 5,680,549 A | 10/1997 | Raynak et al. | |
| 5,701,451 A | 12/1997 | Rogers et al. | |
| 5,706,437 A | 1/1998 | Kirchner et al. | |
| 5,708,780 A | 1/1998 | Levergood et al. | |
| 5,708,786 A | 1/1998 | Teruuchi | |
| 5,710,918 A | 1/1998 | Lagarde et al. | |
| 5,721,876 A | 2/1998 | Yu et al. | |
| 5,724,514 A | 3/1998 | Arias | |
| 5,727,155 A | 3/1998 | Dawson | |
| 5,734,865 A | 3/1998 | Yu | |
| 5,737,416 A | 4/1998 | Cooper et al. | |
| 5,737,592 A | 4/1998 | Nguyen et al. | |
| 5,742,762 A | 4/1998 | Scholl et al. | |
| 5,742,778 A | 4/1998 | Hao et al. | |
| 5,745,573 A | 4/1998 | Lipner et al. | |
| 5,748,892 A | 5/1998 | Richardson | |
| 5,752,246 A | 5/1998 | Rogers et al. | |
| 5,754,830 A | 5/1998 | Butts et al. | |
| 5,757,915 A | 5/1998 | Aucsmith et al. | |
| 5,757,925 A | 5/1998 | Faybishenko | |
| 5,758,085 A | 5/1998 | Kouoheris et al. | |
| 5,761,507 A | 6/1998 | Govett | |
| 5,761,656 A | 6/1998 | Ben-Shachar | |
| 5,761,662 A | 6/1998 | Dasan | |
| 5,764,908 A | 6/1998 | Shoji et al. | |
| 5,764,915 A | 6/1998 | Heimsoth et al. | |
| 5,767,849 A | 6/1998 | Borgendale et al. | |
| 5,768,614 A | 6/1998 | Takagi et al. | |
| 5,790,977 A | 8/1998 | Ezekiel | |
| 5,794,207 A | 8/1998 | Walker et al. | |
| 5,802,258 A | 9/1998 | Chen | |
| 5,802,306 A | 9/1998 | Hunt | |
| 5,812,784 A | 9/1998 | Watson et al. | |
| 5,819,093 A | 10/1998 | Davidson et al. | |
| 5,826,027 A | 10/1998 | Pedersen et al. | |
| 5,828,840 A | 10/1998 | Cowan et al. | |
| 5,838,906 A | 11/1998 | Doyle et al. | |
| 5,838,910 A | 11/1998 | Domenikos et al. | |
| 5,838,916 A | 11/1998 | Domenikos et al. | |
| 5,842,206 A | 11/1998 | Sotomayor | |
| 5,844,553 A | 12/1998 | Hao et al. | |
| 5,848,410 A | 12/1998 | Walls et al. | |
| 5,855,015 A | 12/1998 | Shoham | |
| 5,860,068 A | 1/1999 | Cook | |
| 5,862,325 A | 1/1999 | Reed et al. | |
| 5,870,545 A | 2/1999 | Davis et al. | |
| 5,872,973 A | 2/1999 | Mitchell et al. | |
| 5,874,960 A | 2/1999 | Mairs et al. | |
| 5,877,757 A | 3/1999 | Baldwin et al. | |
| 5,889,942 A | 3/1999 | Orenshteyn | |
| 5,909,545 A | 6/1999 | Frese, II et al. | |
| 5,909,677 A | 6/1999 | Broder et al. | |
| 5,913,060 A | 6/1999 | Discavage | |
| 5,913,920 A | 6/1999 | Adams et al. | |
| 5,923,842 A | 7/1999 | Pedersen et al. | |
| 5,928,324 A | 7/1999 | Sloan | |
| 5,930,804 A | 7/1999 | Yu et al. | |
| 5,938,733 A | 8/1999 | Heimsoth et al. | |
| 5,940,075 A | 8/1999 | Mutschler et al. | |
| 5,941,949 A | 8/1999 | Pedersen | |
| 5,941,988 A | 8/1999 | Bhagwat et al. | |
| 5,944,791 A | 8/1999 | Scherpbier | |
| 5,949,975 A | 9/1999 | Batty et al. | |
| 5,951,694 A | 9/1999 | Choquier et al. | |
| 5,956,403 A | 9/1999 | Lipner et al. | |
| 5,961,586 A | 10/1999 | Pedersen | |
| 5,973,696 A | 10/1999 | Agranat et al. | |
| 5,978,847 A | 11/1999 | Kisor et al. | |

| | | | |
|---|---|---|---|
| 5,978,848 A | 11/1999 | Maddalozzo, Jr. et al. | |
| 5,983,190 A | 11/1999 | Trower et al. | |
| 5,991,406 A | 11/1999 | Lipner et al. | |
| 5,999,179 A | 12/1999 | Kekic et al. | |
| 5,999,950 A | 12/1999 | Krueger et al. | |
| 6,006,242 A | 12/1999 | Poole et al. | |
| 6,012,087 A | 1/2000 | Freivald et al. | |
| 6,023,721 A | 2/2000 | Cummings | |
| 6,034,689 A | 3/2000 | White et al. | |
| 6,038,696 A | 3/2000 | Chouly et al. | |
| 6,052,732 A * | 4/2000 | Gosling | 709/229 |
| 6,058,480 A | 5/2000 | Brown | |
| 6,078,956 A | 6/2000 | Bryant et al. | |
| 6,088,515 A | 7/2000 | Muir et al. | |
| 6,101,507 A | 8/2000 | Cane et al. | |
| 6,108,712 A | 8/2000 | Hayes, Jr. | |
| 6,108,715 A | 8/2000 | Leach et al. | |
| 6,157,944 A | 12/2000 | Pedersen | |
| 6,157,953 A | 12/2000 | Chang et al. | |
| 6,161,126 A | 12/2000 | Wies et al. | |
| 6,167,432 A | 12/2000 | Jiang | |
| 6,173,332 B1 | 1/2001 | Hickman | |
| 6,175,854 B1 | 1/2001 | Bretscher | |
| 6,185,609 B1 | 2/2001 | Rangarajan et al. | |
| 6,199,082 B1 | 3/2001 | Ferrel et al. | |
| 6,199,753 B1 | 3/2001 | Tracy et al. | |
| 6,226,618 B1 | 5/2001 | Downs et al. | |
| 6,263,363 B1 | 7/2001 | Rosenblatt et al. | |
| 6,272,493 B1 | 8/2001 | Pasquali | |
| 6,272,556 B1 | 8/2001 | Gish | |
| 6,272,632 B1 | 8/2001 | Carman et al. | |
| 6,289,461 B1 | 9/2001 | Dixon | |
| 6,292,827 B1 | 9/2001 | Raz | |
| 6,338,086 B1 | 1/2002 | Curtis et al. | |
| 6,367,012 B1 | 4/2002 | Atkinson et al. | |
| 6,370,570 B1 | 4/2002 | Muir et al. | |
| 6,374,237 B1 | 4/2002 | Reese | |
| 6,539,429 B2 | 3/2003 | Rakavy et al. | |
| 6,609,198 B1 | 8/2003 | Wood et al. | |
| 6,691,157 B2 | 2/2004 | Muir et al. | |
| 6,691,232 B1 | 2/2004 | Wood et al. | |
| RE38,598 E | 9/2004 | Frese, II et al. | |
| 6,950,991 B2 | 9/2005 | Bloomfield et al. | |
| 6,952,714 B2 | 10/2005 | Peart | |
| 7,007,070 B1 | 2/2006 | Hickman | |
| 7,080,127 B1 | 7/2006 | Hickman et al. | |
| 7,100,069 B1 | 8/2006 | Hickman et al. | |
| 7,117,243 B2 | 10/2006 | Peart | |
| 7,130,888 B1 | 10/2006 | Hickman et al. | |
| 7,228,426 B2 | 6/2007 | Sinha et al. | |
| 7,359,953 B2 | 4/2008 | Muir et al. | |
| 7,599,985 B2 | 10/2009 | Doyle et al. | |
| 2001/0056547 A1 | 12/2001 | Dixon | |
| 2002/0035451 A1 | 3/2002 | Rothermel | |
| 2002/0052932 A1 | 5/2002 | Curtis et al. | |
| 2003/0037134 A1 | 2/2003 | Hickman | |
| 2003/0063119 A1 | 4/2003 | Bloomfield et al. | |
| 2003/0063324 A1 | 4/2003 | Takaoka | |
| 2005/0188203 A1 | 8/2005 | Bhaskaran et al. | |
| 2005/0210118 A1 | 9/2005 | Hickman et al. | |
| 2006/0184798 A1 | 8/2006 | Yaldwyn et al. | |
| 2006/0282520 A1 | 12/2006 | Hickman et al. | |

FOREIGN PATENT DOCUMENTS

| | | |
|---|---|---|
| EP | 0 384 339 B1 | 8/1990 |
| EP | 0381645 | 8/1990 |
| EP | 0384339 | 8/1990 |
| EP | 0 414 624 A2 | 2/1991 |
| EP | 0 475 581 A2 | 3/1992 |
| EP | 0 483 576 B1 | 5/1992 |
| EP | 0483576 | 5/1992 |
| EP | 0 540 151 B1 | 5/1993 |
| EP | 0540151 | 5/1993 |
| EP | 0 643 514 A2 | 3/1995 |
| EP | 0 648 038 A2 | 4/1995 |
| EP | 0648038 | 4/1995 |
| EP | 0 732 834 B1 | 9/1996 |
| EP | 0732834 | 9/1996 |
| EP | 0 767 563 A2 | 4/1997 |
| EP | 0 841 615 A2 | 5/1998 |
| EP | 0 878 759 A1 | 11/1998 |
| JP | 06-332782 | 12/1994 |
| JP | 06332782 | 12/1994 |
| WO | WO-93/15457 A1 | 8/1993 |
| WO | WO-94/14114 A1 | 6/1994 |
| WO | WO-9718518 | 5/1997 |
| WO | WO-97/28623 A3 | 8/1997 |
| WO | WO-98/52320 A2 | 11/1998 |
| WO | WO-98/52344 A1 | 11/1998 |
| WO | WO-9852320 | 11/1998 |
| WO | WO-9852344 | 11/1998 |
| WO | WO-99/63430 | 12/1999 |

OTHER PUBLICATIONS

Computer Networks and ISDN Systems, Vo. 27, Elsevier Science B.V. (1994) pp. 273-280, S. Putz, "Interactive information services using World-Wide Web hypertext".

Dr. Dobb's Journal, Aug. 1995, pp. 56, 58, 60-61 & 101-2, A. van Hoff, "Java and Internet Programming".

Dr. Dobb's Journal, vol. 21, No. 3, Mar. 1, 1996, pp. 84, 86-89, 96/97, XP000567404, Tessiert T, "Using Javascript to create interactive web pages a cross-platform object scripting language".

Byte, vol. 21, No. 1, Jan. 1, 1996, p. 77/78, 80 XP000567281, Singleton A., "Wired on the Web".

Database, Apr.-May 1995, USA, vol. 18, No. 2, ISSN 0162-4105, pp. 65-67, XP000617303, Davis P., "An interactive hypermedia map viewer (the Xerox PARC map server)".

Behavior Research Methods and Insturmentation, vol. 27, No. 2, Jan. 1, 1995, pp. 200-205, XP000567305, Chu J Y M et al, "Creating a hypertext markup language document for an information server".

Branwyn, Gareth "MOSAIC: Quick Tour for Windows", Ventana Press, pp. 5-7, 57, 61-64, 91-104, and 124-126. (1994).

Jellinek, Herb. "The Animator Applet (1.0.2)-example 1," 199.185.96.71/java/Animator/example1.html, printed Jun. 1, 1999.

Windows NT Networking Guide: Microsoft Windows NT Resource Kit, pp. 79-87, (1995).

Schemers, III, R.J. "Ibnamed: a load balancing name server written in Perl—Update," www-leland.stanford.edu/.about.docs/ibnamed/ibnamed.html, pp. 1-5, (Sep. 17, 1995).

Adler, Richard M. "Distributed Coordination Models for Client/Server Computing," Computer Magazine, pp. 14-22, (Apr. 1995).

Droms, R. "Dynamic Host Configuration Protocol," Network Working Group Request for Comments: 1541, pp. 1-39, (Oct. 1993).

"Allocation of Equivalent Communication Buffer Sizes in SQLJRA Remote Protocol," IBM Technical Disclosure Bulletin, vol. 36, No. 1, pp. 29-31, (Jan. 1993).

"OS/2 EE Database manager SQLJRA Remote Protocol," IBM Technical Disclosure Bulletin, vol. 36, No. 1, pp. 33-36, (Jan. 1993).

Tanenbaum, Andrew S. "Networking in Unix," Computer Networks, pp. 434-435, (1989).

Holtzman, Jeff. "Merge 386: Run Unix and DOS together on an 80386," Byte, pp. cover, 207-208, 211-212, (Dec. 1988).

Mann, Bruce E. et al. "Terminal Servers on Ethernet Local Area Networks," Digital Technical Journal, No. 3, pp. 73-87, (Sep. 1986).

Smith, John et al. "ABC: A Hypermedia System for Artifact-Based Collaboration." Proceedings of the third annual ACM conference on Hypertext.ACM Press. Dec. 1991. 179-192.

Ferrans, James et al. "HyperWeb: A Framework for Hypermedia-Based Environments." ACM SIGSOFT Software Engineering Notes. ACM Press. vol. 17 Issue 5. Nov. 1992. 1-10.

Bulterman, Dick. "Embedded Video in Hypermedia Documents: Supporting Integration and Adaptive Control." ACM Transactions on Information Systems. vol. 13, No. 4. Oct. 1995. pp. 440-470.

Australia Official Action dated Dec. 11, 1998 in AU Appl. No. 76734/96.

PCT International Preliminary Examination Report dated Feb. 13, 1998 in Appl. No. PCT/US96/17937.

European Search Report dated Feb. 4, 2005 in EP Appl. No. 03000050.9.

U.S. Official Action dated Dec. 13, 2002 in U.S. Appl. No. 10/068,790.

U.S. Official Action dated May 9, 2000 in U.S. Appl. No. 09/247,220.
U.S. Official Action dated Nov. 22, 2000 in U.S. Appl. No. 09/247,220.
U.S. Official Action dated Jul. 3, 2001 in U.S. Appl. No. 09/247,220.
U.S. Official Action dated Jun. 2, 1997 in U.S. Appl. No. 08/556,623.
U.S. Official Action dated Feb. 10, 1998 in U.S. Appl. No. 08/556,623.
Canada Official Action dated Jan. 31, 2002 in CA Appl. No. 2,237,333.
Notice of Allowance for U.S. Appl. No. 10/689,824 dated Nov. 21, 2007(4 pages).
Notice of Allowance for U.S. Appl. No. 10/689,824 dated Sep. 25, 2007 (3 pages).
Office Action for U.S. Appl. No. 10/689,824 dated Jun. 15, 2007 (6 pages).
Russia Official Action dated Oct. 23, 2000 in RU Appl. No. 98111487/04 (012578).
Russia Official Action dated Oct. 8, 2001 in RU Appl. No. 98111487/04 (012578).
Europe Official Action dated Sep. 11, 1998 in EP Appl. No. 96 939 600.1-2201.
Europe Official Action dated Apr. 20, 2000 in EP Appl. No. 96 939 600.1-2201.
Japan Official Action dated Sep. 20, 2005 in JP Appl. No. 09-518948.
Japan Official Action dated Apr. 4, 2006 in JP Appl. No. 09-518948.
Korean Official Action dated Jan. 11, 2005 in KR Appl. No. 1998-0703559.
Korean Official Action dated May 19, 2004 in KR Appl. No. 1998-0703559.
Notice of Allowance for U.S. Appl. No. 12/054,987 dated Jun. 27, 2011.
Anonymous, "Citrix Metaframe 1.8-Backgrounder", Internet Article, (Online), Apr. 24, 1999, available at: http://web.archive.org/web/19990424125017 and http://citrix.com/library/pdf/METAFRAME.sub.—BCKGRNDER.pdf.
EP 03 70 8996 (PCT/US 0303647) Supplementary European Searcg Report, Oct. 25, 2006.
Examiner's First report on Australian Patent Application No. 2003212953 (PCT/US2003/003647) dated Mar. 29, 2007.
Examiner's Report on European Patent Application No. 03 708 996. 8-1243 (PCT/2003/003647) dated Oct. 25, 2006.
Extended European Search Report on 10186276.1 dated Jul. 26, 2011.
IBM Technical Disclosure Bulletin, Mar. 1993, U.S, Volime # 36, Issue # 3, pp. 421-426, Corss Reference 0018-8689-36-3-421.
International Search Report for corresponding PCT Application No. PCT/US2007/021948, mailed May 2, 2008, 4 pages.
International Search Report, PCT/US03/03647, dated Apr. 29, 2003.
IP Multicast Streamlines Delivery of Multicast Applications; Copyright 1995 .COPYRGT. Cisco Systems, Inc.; pp. 1-5.
Mathers: "MetaFrame 1. 8 Service Pack 2 and Feature Release 1: Frequently Asked Questions (FAQ), Part 1", Jan. 29, 2001, pp. 1-4, XP002588434, Retrieved from the Internet: URL:http://www.informit.com/articles/article.aspx?p=20552 [retrieved on Jun. 23, 2010].
Office Action on U.S. Appl. No. 12/054,987 dated Jan. 21, 2011.
Written Opinion for corresponding PCT Application No. PCT/US2007/021948, mailed May 2, 2008, 5 pages.

* cited by examiner

METHODS AND APPARATUS FOR MAKING A HYPERMEDIUM INTERACTIVE

CROSS REFERENCE TO RELATED APPLICATIONS

This application is a continuation of application Ser. No. 12/054,987 filed on Mar. 25, 2008 (now U.S. Pat. No. 8,090, 793), which is a continuation of application Ser. No. 10/689, 824 filed on Oct. 20, 2003 (now U.S. Pat. No. 7,359,953), which is a continuation of application Ser. No. 10/068,790 filed on Feb. 6, 2002 (now U.S. Pat. No. 6,691,157), which is itself a continuation of application U.S. Ser. No. 09/247,220 filed on Feb. 10, 1999 (now U.S. Pat. No. 6,370,570), which is itself a continuation of application U.S. Ser. No. 08/556, 623 filed on Nov. 13, 1995 (now U.S. Pat. No. 6,088,515), all of which are incorporated herein by reference.

FIELD OF THE INVENTION

The invention relates generally to the field of computer communications and more specifically to the field of remote application processing.

BACKGROUND

A hypermedium is a graphical display which contains a series of graphic and textual images which are referred to as hyperlinks Each hyperlink typically corresponds to additional information which is available to a user of the hypermedium. For example a hypermedium display might be an encyclopedic article about flight. If the graphical display of the article includes a picture of a rocket, and if the user is able to obtain information about the engine of the rocket by selecting (typically by using a pointing device referred to as a computer mouse) a portion of the display showing the engine, the portion of the picture containing the rocket engine is referred to as a hyperlink. That is, the portion of the picture containing the engine is a link to information about the engine. The activation of a hyperlink causes the hypermedium to request a data file of the desired information from the program actually controlling the hypermedium.

When a hypermedium is used in conjunction with a network, for example the world wide web or the internet, a user on a client node on the network first accesses what is termed a home page or a web page. This home page or web page is obtained from another node on the net, termed a network server, and is displayed on the client node by a program termed a network browser or web browser. In such a case, when the user selects the hyperlink (in the previous example, the portion of the display showing the rocket engine) a request is made to the network browser for the data file containing the requested information. The network browser on the user's node establishes communication with the network node, the data server, having data corresponding to the requested hyperlink. In this case the node having information about the rocket engine contains the information required by the hyperlink.

Although hypermedium has been used to transfer information to a user in the manner just discussed, it is desirable to be able to use a hypermedium display to interactively execute applications such as database programs located on another computer, an application execution server, on the network. The present invention relates to a method and apparatus to accomplish this task.

SUMMARY OF THE INVENTION

The invention relates to a system of making a hypermedium page interactive to thereby permit an application to be executed on one node and the results displayed and data entered on another node. In one embodiment the system includes a client node, a network server node and an application execution server node interconnected by a communication link. A hyperlink on the hypermedium page is displayed on the client node and a hyperlink configuration file (corresponding to the hyperlink on the client node) is located on the network server node. In one embodiment, a client agent is located on the client node and a server agent is located on the application execution server node. A communication link is created by the client agent between the client agent on the client node and the server agent on the application execution server node in response to data in the hyperlink configuration file. The system also includes an application on the application execution server node which executed on the application execution server node in response to the communications link between the client agent and the server agent. The application running on the application execution node then communicates with the client agent through the server agent. The client agent on the client node is responsible for receiving data input from the user and transferring the data to the application on the application execution node and receiving data from the application on the application execution node and displaying data output to the user on the client node.

The invention also relates to a method of making a hypermedium page interactive. The method includes the steps of selecting a hyperlink on the hypermedium page displayed on a client node; retrieving (from a server node to the client node) a hyperlink configuration file corresponding to the hyperlink and starting a client agent on the client node. The method further includes the steps of creating a communications link between a server agent on an application execution server and the client agent; starting the application on the application execution server in response to the connection; communicating data between the client agent on the client node and application on the application execution node; and managing the display and input of data on the client node.

BRIEF DESCRIPTION OF THE DRAWINGS

Other features and benefits of the invention can be more clearly understood with reference to the specification and the accompanying drawings in which.

DETAILED DESCRIPTION OF THE INVENTION

Figure 1:
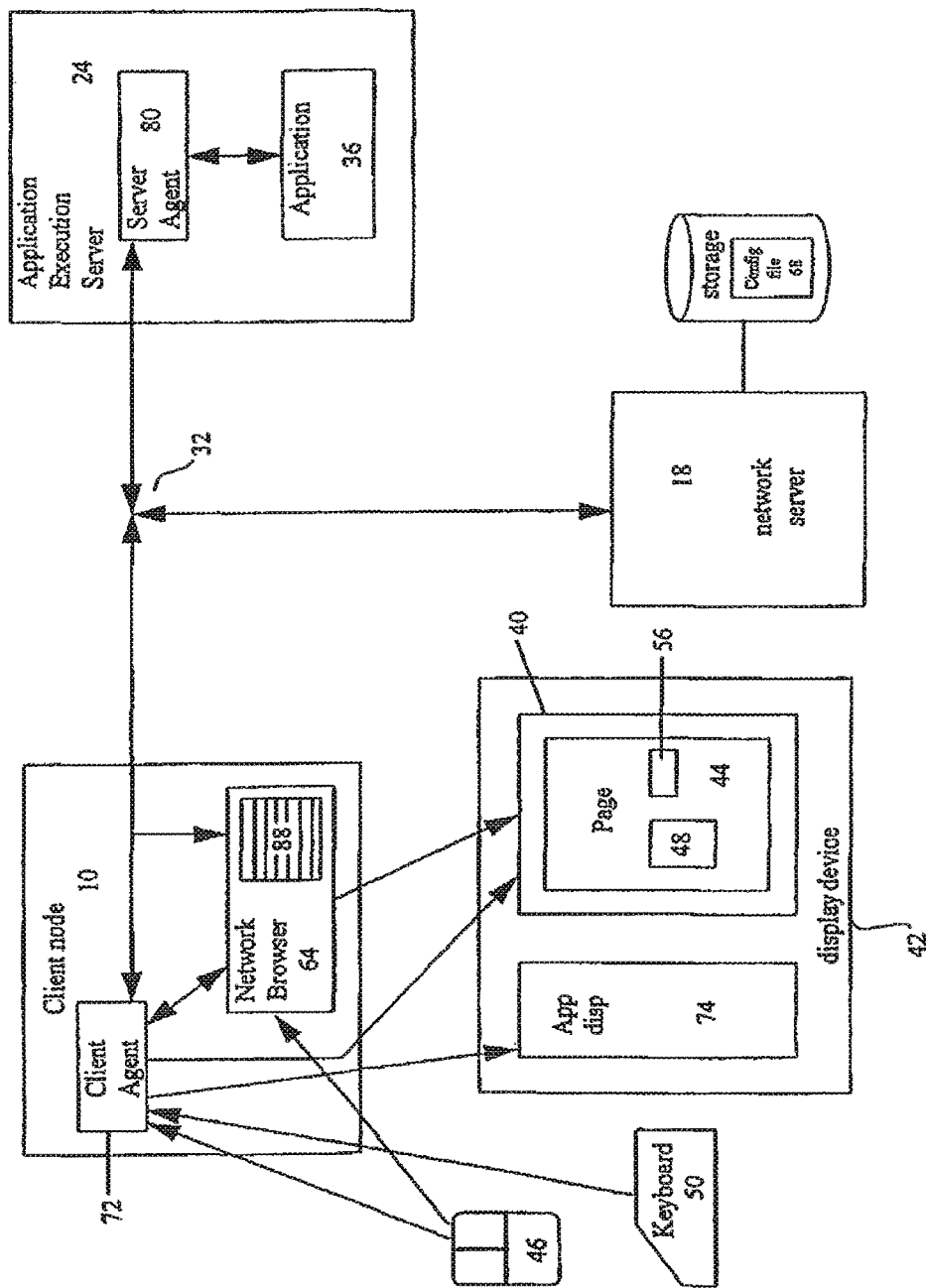
FIG. 1 is a block diagram of an embodiment of the system of the invention.

Referring to FIG. 1, and in brief overview, an embodiment of an interactive hypermedium system of the invention includes a client node 10, a network server node 18 and an application execution server node 24 interconnected by a communications link 32, herein referred to without any loss of generality as a network or web. Although only one client node 10, network server node 18 and application execution server node 24, are shown in FIG. 1 for clarity, an actual network may include many such nodes. Alternatively, the services provided by each of the nodes listed may be combined in one or more nodes. For example, the application execution server and the network server may in fact be the same node. In the extreme it is possible for all functions to be performed by the same node, although such would not typically be the case. In addition, although only one application 36 is shown on the application execution server 24, in reality, an application execution server node 24 typically includes many applications 36. Each node on the network or web 32 includes a processor, which may vary significantly from other processors on the web 32 in terms of computing power and associated hardware. Further, the applications 36 available for execution on each node may be different.

A user on a client node wishing to run the application program 36 which is located on the application execution server 24 on the web 32 does so through a graphical user interface 40, which is herein referred to without any loss of generality as a hypermedium, located on the client node 10. The graphical interface is displayed on a graphical display device 42. Data is entered by the users through a mouse 46 and a keyboard 50 located on the client node 10. The graphical display or page 44 which the user first views on the hypermedium 40 is referred to herein without any loss of generality as the home page or web page of the application 36. A page 44 or home page of the hypermedium 40 includes a graphic link 48 or textual link 56 herein referred to without any loss of generality as a hyperlink. The web page is displayed by a process 64 referred to herein without any loss of generality as a network browser 64 executing on the client node 10.

The network browser 64 obtains the first page or web page 44 from a network server node 18 and displays the web page 44 on the hypermedium 40 for the user to view on the graphical display device 42. When the user selects an application program 36 to execute (by selecting a graphical 48 or textual 56 hyperlink using the mouse 46 or keyboard 50) the network browser 64 obtains a network configuration file 68 corresponding to the selected application 36 from a predetermined network server 18 and starts a client agent 72 which will communicate with the selected application 36. This will be discussed in more detail below.

The client agent 72 reads the configuration file 68 and establishes a communications link to a server agent 80 on the application execution server 24 specified by the configuration file 68. In one embodiment, the configuration file 68 includes the name of the application and the node location of the application 36 corresponding to the hyperlink 48, 56. The configuration file may also contain optional information such as authentication or authorized user information. Server agent 80 performs the operations necessary (such as authentication) to permit the client agent 72 access to the application 36, and once access is permitted, starts the application 36 requested by the user. Once the application 36 is executing on the application execution server, the application 36 communicates through the server agent 80 directly with the client agent 72 without intervention by the network browser 64. The client agent 72 is then responsible for receiving data from the user through the mouse 46 and keyboard 50 and transmitting it to the application program 36 the application execution server 24. Similarly, the client agent 72 is responsible for receiving data from the application 36 on the application execution server 24 and displaying the data in an application display window 74 on the graphical display device 42 on the client node 10. It should be noted that the application display window 74 may be located within the boundaries or outside the boundaries of the hypermedium 40. When the application 36 is completed the server agent 80 instructs the client agent 72 to disconnect the communication link 32 between the client agent 72 and the server agent 80 and the server agent waits for the next connection.

Figure 2:
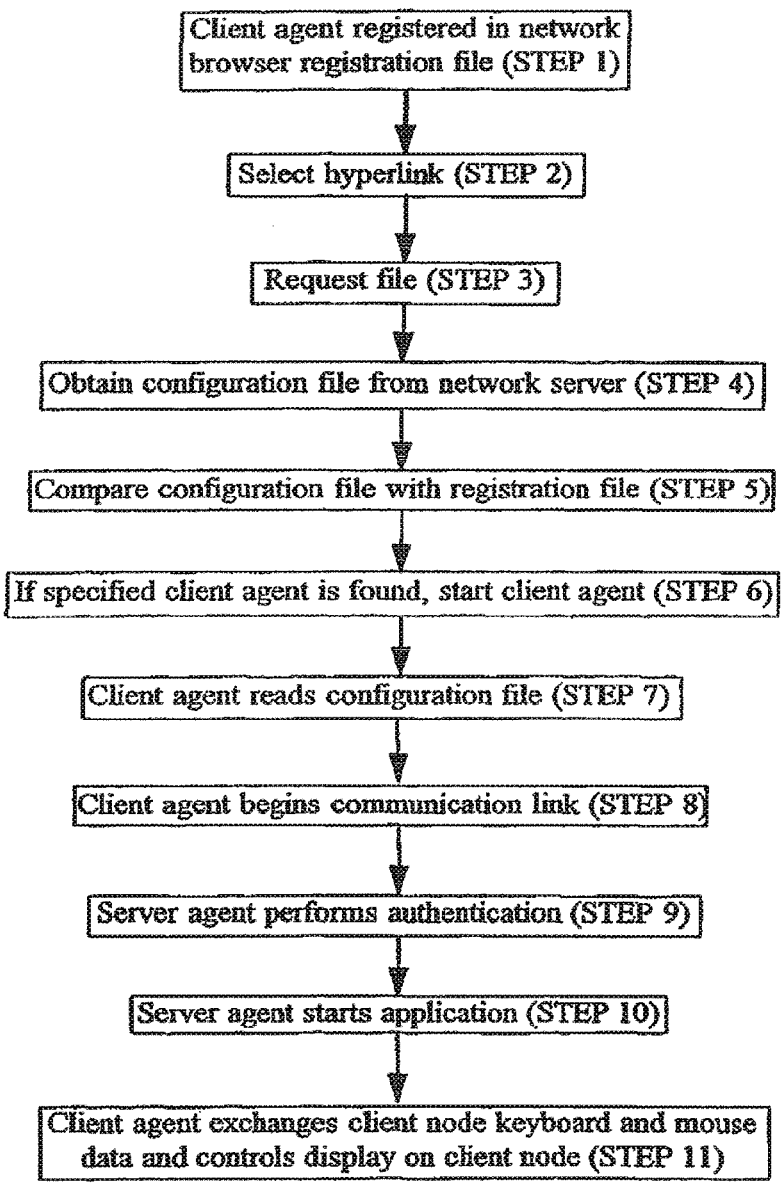
FIG. 2 is a flow chart of the operation of system of the invention shown in FIG. 1.

FIG. 2 depicts the operation of the system in more detail. Initially, the client agent 72 is registered (Step 1) with the network browser 64 of the client node 10 and an entry is made in the network browser's registration file 88 (FIG. 1). This entry permits the network browser 64 to start the client agent 72 whenever a given file type is requested by the hyperlink 48, 56 of the hypermedium 40. In this case the client agent 72 is designed to permit a user on the client node 10 to execute and interact with a remote application 36 on an application execution server node 24. The client agent 72 would be registered with the network browser 64 such that whenever a hyperlink 48, 56 requested the given file type (for example .RMT for remote execution) from the network browser 64, the network browser 64 would start the client agent 72 which would permit remote execution and interaction with an application 36 resident on an application execution server 24. The invoking of the client agent 72 is discussed in more detail below.

Next, when a user wishes to execute an application from a hypermedium environment, for example a database program, the hypermedium 40 is displayed in a manner that is well known to those skilled in the art. When the user selects a hyperlink 48, 56 on the page 44 of the hypermedium (Step 2) by using the mouse 46 or keyboard 50 on the client node 10, a request is made to the network browser 64 for the corresponding data file (Step 3). In this example, the filetype (.RMT) is requested.

The network browser 64 obtains the corresponding configuration file 68 from the network server 18 which is specified in the file request made by the hyperlink 48, 56 to the network browser 64 (Step 4). The network browser 64 then compares the obtained configuration file 68 with the registration file 88 of client agent names which it maintains (Step 5). If the client agent 72 specified by the configuration file 68 is found in the registration file 88, the client agent 72 is started (Step 6).

The invoked client agent 72 reads the configuration file 68 (Step 7), and based upon the information in the configuration file 68, begins to establish a communication link with the server agent 80 on the application execution server 24 (Step 8), in this case the sales database application execution server (generally 24).

Considering the process of beginning the communications link of step 8 (FIG. 2) in more detail, communication begins with the server agent 80 monitoring communication activity on the network 32. At this point, no protocol assumptions are made by the server agent 80 beyond those necessary for the transport layer. Similarly, the client agent 72 also makes no assumption of the communications protocol beyond that required by the transport layer. Once the server agent 80 determines that a client agent 72 is attempting to communicate with it, the server agent 80 transmits a message to the client agent 72 indicating that service is available.

Once the client agent 72 determines that service is available on the application execution server node 24, the client agent 72 transmits a message to the server agent 80 indicating that it is ready to proceed with the communication protocol. Once the server agent 80 has responded that it is ready to continue the communication protocol, the client agent 72 enables the protocol necessary for it to run the application 36. In response to the message from the client agent 72, the server agent 80 also enables the required protocol. The server agent 80 then transmits a message using the required protocol indicating that the client agent's request has been received and accepted.

In response the client agent 72 and the server agent 80 exchange a set of messages which negotiate the parameters under which communications will occur. Once negotiations are complete, the client agent 72 and the server agent 80 are able to communicate as necessary for the application 36 to be run by the user.

Once the communications protocol has been established and the server agent 80 has authenticated the client agent 72 (Step 9) (for example determining that the user has permission to read and write to the database) the application 36 (Step 10) is run on the application execution server 24. At this point application 36 running on the application execution server 24 is communicating via the server agent 80 with the client agent 72 on the client node 10. The client agent 72 is now responsible for transmitting data input by the user using the mouse 46 and keyboard 50 to the application 36 running on the application execution server 24. Further, the client agent 72 is responsible for receiving data for display from the application 36 and displaying that data in the application window 74 on the graphical display device 42 of the client node 10.

It should be noted that the underlying presentation protocol which passes data to a transport layer such as TCP/IP must be capable of transferring graphical information. Examples of such protocols which may be used for interactive hypermedia communication include public domain X-WINDOWS protocol and the proprietary ICA protocol of Citrix Systems Inc.

Thus the above described system permits a user on a client node 10, which may have very limited resources, to start and interact with an application program 36 located on another application execution server node 24. The application 36 then runs on the application execution server node 24 and the data is input and the results displayed on the client node 10.

These and other examples of the concept of the invention illustrated above are intended by way of example and the actual scope of the invention is to be determined solely from the following claims.

What is claimed is:

1. A method of obtaining application data, the method comprising:
    selecting, by a client computing device, a hyperlink within a graphical interface of a web portal displayed on a display device in communication with the client computing device, the hyperlink corresponding to an application;
    receiving, in response to the selection of the hyperlink, a configuration file associated with the hyperlink;
    identifying, using the received hyperlink file, a server capable of executing the corresponding application;
    establishing a communication protocol providing communication between the identified server and the client computing device, the communication protocol facilitating communication over one or more channels;
    receiving, from the server via one of the channels, application data generated by the application executing on the server; and
    displaying the received application data on the display device.

2. The method of claim 1, wherein establishing a communication protocol further comprises establishing a communication protocol that facilitates communication over multiple channels.

3. The method of claim 1, wherein establishing a communication protocol further comprises
    establishing a transport layer communication between the client computing device and the identified server;
    enabling a communication protocol above the transport layer; and
    negotiating parameters of the communication protocol above the transport layer via the established transport layer communication.

4. The method of claim 3, wherein receiving application data comprises receiving application data via the communication protocol above the transport layer.

5. The method of claim 1, further comprising obtaining a hypermedium page from a network prior to selecting a hyperlink, the hypermedium page including the selected hyperlink.

6. The method of claim 1, wherein identifying a server further comprises identifying a server executing the application.

7. The method of claim 1, wherein identifying a server further comprises identifying a server executing a plurality of instances of the application.

8. A non-transitory computer readable medium having instructions executable by a processor within a client computing device to obtain application data, the computer readable medium comprising:
    non-transitory computer-readable instructions to select a hyperlink within a graphical interface of a web portal displayed on a display device in communication with a client computing device, the hyperlink corresponding to an application;
    non-transitory computer-readable instructions to receive, in response to the selection of the hyperlink, a configuration file associated with the hyperlink;
    non-transitory computer-readable instructions to identify, using the received configuration file, a server capable of executing the corresponding application;
    non-transitory computer-readable instructions to establish a communication protocol providing communication between the identified server and the client computing device, the communication protocol facilitating communication over one or more channels;
    non-transitory computer-readable instructions to receive, from the server via one of the channels, application data generated by the application executing on the server; and
    non-transitory computer-readable instructions to display the received application data on the display device.

9. The computer readable medium of claim 8, wherein non-transitory computer-readable instructions to establish a communication protocol further comprises non-transitory computer-readable instructions to establish a communication protocol that facilitates communication over multiple channels.

10. The computer readable medium of claim 8, wherein non-transitory computer-readable instructions to establish a communication protocol further comprises non-transitory computer-readable instructions to
    establish a transport layer communication between the client computing device and the identified server;
    enable a communication protocol above the transport layer; and
    negotiate parameters of the communication protocol above the transport layer via the established transport layer communication.

11. The computer readable medium of claim 10, wherein non-transitory computer-readable instructions to receive application data comprise non-transitory computer-readable instructions to receive application data via the communication protocol above the transport layer.

12. The computer readable medium of claim 8, further comprising non-transitory computer-readable instructions to obtain a hypermedium page from a network prior to selecting a hyperlink, the hypermedium page including the selected hyperlink.

13. The computer readable medium of claim 8, wherein non-transitory Computer-readable instructions to identify a server further comprises non-transitory-computer-readable instructions to identify a server executing the application.

14. The computer readable medium of claim 8, wherein non-transitory computer-readable instructions to identify a server further comprises non-transitory computer-readable instructions to identify a server executing a plurality of instances of the application.

* * * * *